United States Patent [19]

Noguchi et al.

[11] 4,175,501
[45] Nov. 27, 1979

[54] INTERNAL COMBUSTION ENGINE WITH AN AUXILIARY COMBUSTION CHAMBER

[75] Inventors: Masaaki Noguchi, Nagoya; Shougo Sanda, Numazu; Masaaki Takizawa, Mishima, all of Japan

[73] Assignee: Toyota Jidosha Kogyo Kabushiki Kaisha, Toyota, Japan

[21] Appl. No.: 820,248

[22] Filed: Jul. 29, 1977

[30] Foreign Application Priority Data

Jun. 1, 1977 [JP] Japan .................... 52-63169

[51] Int. Cl.² .......................... F02B 19/08
[52] U.S. Cl. .............. 123/30 D; 123/32 SP; 123/191 S
[58] Field of Search ......... 123/30 C, 30 D, 32 SP, 123/32 B, 32 C, 32 CY, 191 R, 191 S, 191 SP

[56] References Cited

U.S. PATENT DOCUMENTS

| | | | |
|---|---|---|---|
| 1,422,794 | 7/1922 | Smith | 123/32 SP |
| 1,555,809 | 9/1925 | Burtnett | 123/191 S |
| 1,596,240 | 8/1926 | Dikeman | 123/32 SP |
| 2,127,512 | 8/1938 | Harper | 123/169 |
| 2,741,229 | 4/1956 | Stump | 123/32 C |
| 2,808,036 | 10/1957 | Seggern et al. | 123/32 CY |
| 2,826,187 | 3/1958 | Meyer | 123/191 SP |
| 3,230,939 | 1/1966 | Goossak | 123/32 SP |
| 3,890,940 | 6/1975 | List | 123/191 S |
| 3,924,584 | 12/1975 | Decker | 123/191 SP |
| 4,038,959 | 8/1977 | Takizawa et al. | 123/191 S |
| 4,092,969 | 6/1978 | Ono et al. | 123/32 SP |

FOREIGN PATENT DOCUMENTS

| | | | |
|---|---|---|---|
| M 18616 | 1/1956 | Fed. Rep. of Germany | 123/32 SP |
| 2522577 | 12/1976 | Fed. Rep. of Germany | 123/191 S |
| 2537041 | 3/1977 | Fed. Rep. of Germany | 123/30 D |
| 962632 | 6/1950 | France | 123/30 D |

*Primary Examiner*—Charles J. Myhre
*Assistant Examiner*—Craig R. Feinberg
*Attorney, Agent, or Firm*—Stevens, Davis, Miller & Mosher

[57] ABSTRACT

Disclosed is an internal combustion engine comprising a main combustion chamber and an auxiliary combustion chamber which are interconnected to each other via a connecting passage. The auxiliary combustion chamber symmetrically extends about an axis. The opening of the connecting passage is arranged on the periphery of the inner wall of the cylinder head and is directed in the circumferential direction of the inner wall of the cylinder head. A swirl motion creating means is provided for creating a swirl motion of the combustible mixture which rotates about the axis of the auxiliary combustion chamber at the time of the compression stroke. The spark gap of the spark plug is located on the axis of the auxiliary combustion chamber and in the deep interior of the auxiliary combustion chamber.

6 Claims, 5 Drawing Figures

INTERNAL COMBUSTION ENGINE WITH AN AUXILIARY COMBUSTION CHAMBER

DESCRIPTION OF THE INVENTION

The present invention relates to the improvement of an internal combustion engine which is disclosed in the specification of U.S. Pat. application Ser. No. 684,476 (application date: May 10, 1976) by Bela, Karlovitz and in the specification of U.S. Pat. application Ser. No. 704,505 (application date: July 12, 1976) abandoned in favor of continuation application Ser. No. 867,881 (application date: Jan. 9, 1978) by the same inventors as the present inventors.

An internal combustion engine is known in which a combustion chamber comprises a main combustion chamber and an auxiliary combustion chamber. The main combustion chamber and the auxiliary combustion chamber are interconnected via a connecting passage. The spark gap of a spark plug is located in the auxiliary combustion chamber. At the time of the compression stroke, a lean air-fuel mixture, or a mixture containing a large amount of recirculated exhaust gas therein introduced into the main combustion chamber is pushed into the auxiliary combustion chamber via the connecting passage, and then the combustible mixture is ignited to burn in the auxiliary combustion chamber. Then a high velocity burning jet is injected into the main combustion chamber from the connecting passage, whereby the high velocity burning jet causes combustion of the combustible mixture in the main combustion chamber.

In an internal combustion engine of this type, there is an advantage such that, since the initially ignited part of the combustible mixture in the auxiliary combustion chamber is confined for a long time in the auxiliary combustion chamber until the initially ignited part reaches the outlet of the auxiliary combustion chamber, that is, the connecting passage, the pressure in the auxiliary combustion chamber sufficiently increases, whereby a strong high velocity burning jet can be obtained. There is a further advantage such that, since the ignition timing scarcely influences the ease of ignition, the ignition timing can be set so that the spark plug is operated in the vicinity of an ignition timing in which the rate of fuel consumption is low and in which the engine can develop maximum torque. However, contrary to this, there are disadvantages in that the pressure in the auxiliary combustion chamber increases extraordinarily, thus causing a violent combustion in the auxiliary combustion chamber, whereby the combustion in the auxiliary combustion chamber is completed in a short time. As a result of this, the high velocity burning jet does not continue to be injected into the main combustion chamber until the combustion in the main combustion chamber has been completed. Consequently, a reduction in the effectiveness of the high velocity burning jet for quickening the speed of the combustion in the main combustion chamber occurs, resulting in the disadvantages that a satisfactory stable combustion cannot be obtained and a large amount of harmful components is produced.

In order to eliminate these disadvantages, the internal combustion engines which are disclosed in the specifications of the above-mentioned U.S. Patent Applications have been proposed. In these engines, a swirl motion generating means is disposed in the flame jet injecting outlet of the auxiliary combustion chamber so as to create a swirl motion of the combustible mixture in the auxiliary combustion chamber at the time of the compression stroke, which swirl motion rotates around the central axis of the auxiliary combustion chamber. In addition, the spark gap of the spark plug is located in the auxiliary combustion chamber at a position located on or near the central axis of the auxiliary combustion chamber. Accordingly, the combustible mixture located around the central axis of the auxiliary combustion chamber is ignited by the spark plug so that the high velocity burning jet continues to be injected from the connecting passage for a long time until the combustion in the main combustion chamber has been completed.

In an engine of this type, since the length of time of the injection of the burning jet is quite extended as compared with that of a conventional engine, the speed of the combustion in the main combustion chamber can be quickened. However, in the above-mentioned engine, a satisfactory high speed of combustion cannot be obtained.

An object of the present invention is to provide an internal combustion engine having an auxiliary combustion chamber, which is capable of obtaining a satisfactory combustion speed in the main combustion chamber.

According to the present invention, there is provided an internal combustion engine comprising:
a cylinder block having a cylinder bore therein;
a cylinder head having a cavity therein and mounted on the cylinder block, which cavity defining an auxiliary combustion chamber symmetrically extending about an axis;
a piston reciprocally movable in the cylinder bore, which piston and the cylinder head forming therebetween a main combustion chamber having an inner wall;
an intake valve movably mounted on the cylinder head for leading a combustible mixture into the main combustion chamber;
an exhaust valve movably mounted on the cylinder head for discharging an exhaust gas into the atmosphere;
a connecting passage communicating the main combustion chamber with the auxiliary combustion chamber and having an opening which is arranged on the periphery of the inner wall of the cylinder head and is directed in the circumferential direction of the inner wall of the cylinder head;
a swirl motion creating means for creating a swirl motion of the combustible mixture rotating about the axis of the auxiliary combustion chamber in the auxiliary combustion chamber at the time of the compression stroke, and;
a spark plug having a spark gap located in the vicinity of the axis of the auxiliary combustion chamber in the auxiliary combustion chamber.

The present invention may be more fully understood from the following descriptions of preferred embodiments of the invention, together with the accompanying drawings.

DESCRIPTION OF PREFERRED EMBODIMENTS

Figure 1:
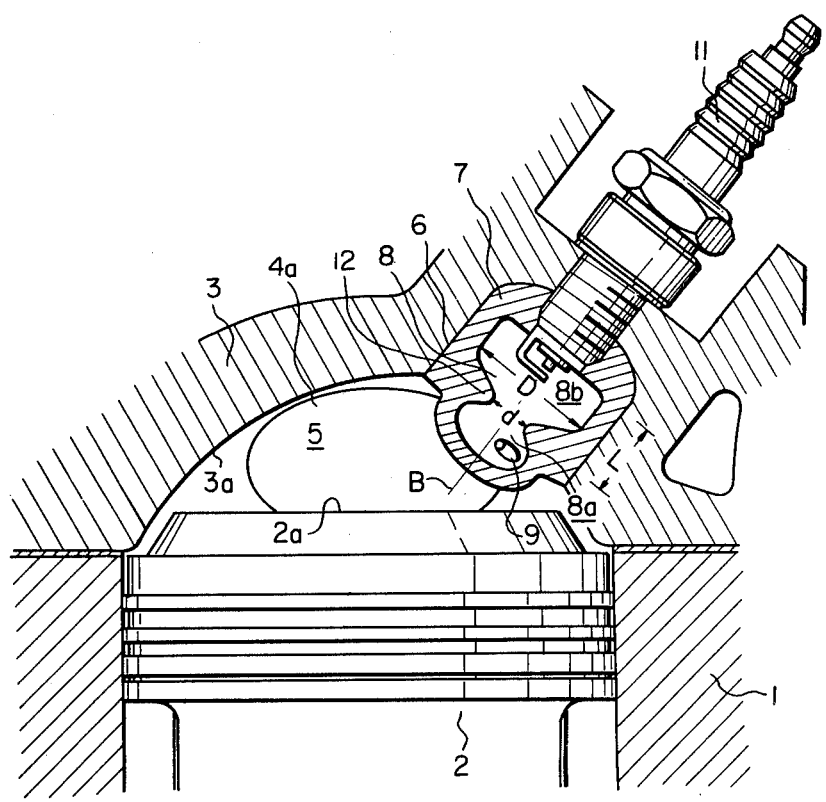
FIG. 1 is a cross-sectional side view of an internal combustion engine according to the present invention.
Figure 2:
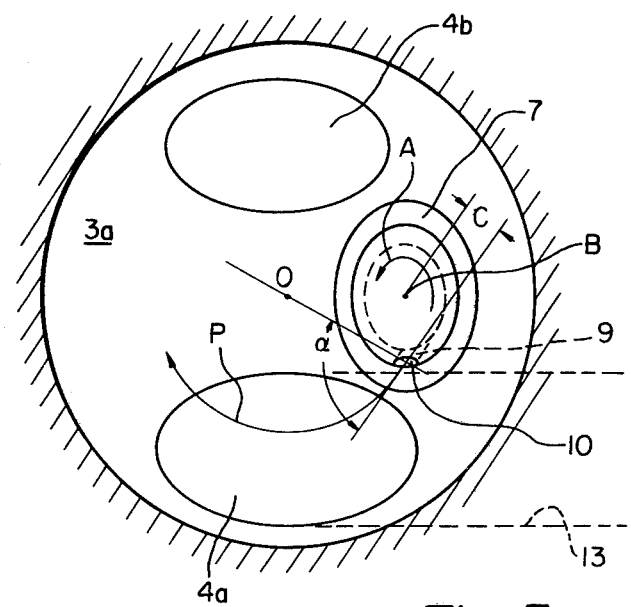
FIG. 2 is a bottom view of the cylinder head shown in FIG. 1.

Referring to FIGS. 1 and 2, an internal combustion engine comprises a cylinder block 1, a piston 2 reciprocally movable in the cylinder block 1, a cylinder head 3 fixed onto the cylinder block 1, an intake valve 4a, an exhaust valve 4b (FIG. 2), a main combustion chamber 5 formed between the semi-spherical inner wall 3a of the cylinder head 3 and the top surface 2a of the piston 2, an auxiliary chamber component 7 press-fitted into a recess 6 formed in the cylinder head 3, an auxiliary combustion chamber 8 formed in the auxiliary chamber component 7, a connecting passage 9 communicating the main combustion chamber 5 with the auxiliary combustion chamber 8, and a spark plug 11 having a spark gap located in the auxiliary combustion chamber 8. The auxiliary combustion chamber 8 has on its inner surface an annular raised portion 12 which forms a circular-shaped restricted opening having a diameter d. The auxiliary combustion chamber 8 is divided into a first auxiliary chamber 8a and a second auxiliary chamber 8b by the restricted opening. The first auxiliary chamber 8a is connected to the main combustion chamber 5 via the connecting passage 9. This connecting passage 9 is arranged so as to extend in the tangential direction of the inner peripheral wall of the first auxiliary chamber 8a so that a combustible mixture introduced into the first auxiliary chamber 8a from the main combustion chamber 5 via the connecting passage 9 at the time of the compression stroke is swirled in the first auxiliary chamber 8a as indicated by arrow A in FIG. 2.

In order to create a strong swirl motion, it is preferable that the distance C between the central axis B of the auxiliary combustion chamber 8 and the axis of the connecting passage 9 be as large as possible. However, if the volume of the first auxiliary chamber 8a is enlarged, then the unburned mixture in the first auxiliary chamber 8a would be injected into the main combustion chamber 5 when the combustible mixture in the second auxiliary chamber 8b is ignited. In order to avoid the injection of the unburned mixture, the volume of the first auxiliary chamber 8a is required to be smaller than that of the second auxiliary chamber 8b. Consequently, by taking the above-mentioned circumstance into consideration, the distance C is determined. The spark gap of the spark plug 11 is located in the vicinity of the central axis B in the second auxiliary chamber 8b having a diameter D. However, as is hereinafter mentioned, the spark gap of the spark plug 11 may be located at any other position in the vicinity of the central axis B in the auxiliary combustion chamber 8. In operation, a lean air-fuel mixture, or a mixture containing a large amount of recirculated exhaust gas therein is introduced into the main combustion chamber 5 via the intake valve 4a during the intake stroke. Then, the combustible mixture is pushed into the first auxiliary chamber 8a via the connecting passage 9 at the time of the compression stroke. At this time, a strong swirl of the combustible mixture turning around the central axis B is created in the first auxiliary chamber 8a. Then, the auxiliary mixture is pushed into the second auxiliary chamber 8b through the restricted opening while continuing to swirl, and thus a swirl of the combustible mixture turning around the central axis B is also created in the second auxiliary chamber 8b. When the piston 2 reaches the vicinity of the top dead center, the combustible mixture in the auxiliary combustion chamber 8 is ignited by the spark plug 11. As is aforementioned, the combustible mixture in the auxiliary combustion chamber 8 rotates around the central axis B. Consequently, the speed of the combustible mixture is nearly equal to zero on the central axis B, whereby the combustible mixture is easily ignited.

After the combustible mixture is ignited, since the combustible mixture rotates around the central axis B, the combustion gas has a high temperature and, hence, a small specific weight is collected in the vicinity of the center of the swirl, that is, around the central axis B due to a centrifugal force. On the other hand, the unburned mixture has a low temperature and, hence, a large specific weight is collected in the vicinity of the periphery of the swirl, that is, on the peripheral inner wall of the second auxiliary chamber 8b. The combustion gas having a high temperature in the second auxiliary chamber 8b is spread into the first auxiliary chamber 8a via the restricted opening, whereby a high velocity burning jet is injected into the main combustion chamber 5 via the connecting passage 9. As is aforementioned, the annular raised portion 12 forming the restricted opening is formed between the first auxiliary chamber 8a and the second auxiliary chamber 8b. Consequently, the combustion gas having a high temperature and collected on the central axis B in the second auxiliary chamber 8b can be delivered into the first auxiliary chamber 8a via the restricted opening, while the unburned mixture collected on the peripheral inner wall of the second auxiliary chamber 8b remote from the central axis B is prevented from flowing into the first auxiliary chamber 8a due to the presence of the annular raised portion 12. Thus, no unburned mixture is injected into the main combustion chamber 5 from the connecting passage 9 when the combustible mixture in the second auxiliary chamber 8b is ignited. According to the experiment tried by the inventors, in order to prevent the injection of the unburned mixture into the main combustion chamber 5 as is aforementioned, the ratio d/D of the diameter d of the restricted opening to the diameter D of the second auxiliary chamber 8b is required to be less than 0.8, and the ratio D/L of the diameter D of the second auxiliary chamber 8b to the axial length L of the second auxiliary chamber 8b (said axial length L is defined by a distance between the inner wall of the second auxiliary chamber 8b remote from the first auxiliary chamber 8a and the position in which the diameter of the restricted opening is minimum) is required to be more than 1.

Furthermore, the combustion gas having a small specific weight, which is collected in the vicinity of the central axis B as is aforementioned, cannot move easily towards the unburned mixture having a large specific weight located around the combustion gas, since the combustion gas is acted upon by an action of pushing said combustion gas back towards the central axis B due to the buoyancy created based on the centrifugal force difference of the two above-mentioned specific weights. Consequently, the combustion gas cannot easily spread outwards, thus completion of the combustion in the auxiliary combustion chamber 8 is delayed compared with the case wherein the combustible mixture is not swirled in the auxiliary combustion chamber 8. As a result of this, a high velocity burning jet can continue to be injected until the combustion in the main combustion chamber 5 has been completed; thus, completion of the combustion in the main combustion chamber 5 is quickened. In addition, the combustion in the auxiliary combustion chamber 8 is not so violent, thus preventing the creation of a combustion noise.

On the other hand, according to the present invention, as is shown in FIG. 2, the opening 10 of the connecting passage 9 is arranged in the periphery of the inner wall 3a of the cylinder head 3 (FIG. 1) and is directed in the circumferential direction of the inner wall 3a so that the burning jet injected from the connecting passage 9 can cause a swirl motion of the combustible mixture flowing in the main combustion chamber 5 (FIG. 1) along the inner wall 3a of the cylinder head 3 as shown by the arrow P in FIG. 2. According to the experiment conducted by the inventors, it has been proven that it is preferable that a ratio of the distance between the central axis of the main combustion chamber 5 and the opening 10 of the connecting passage 10 to the radius of the piston 2 (FIGS. 1 and 2) be in the range of from 0.5 to 0.8:1, and that it is also preferable than an angle α (FIG. 2) between the axis of the connecting passage 9 and the line passing through the opening 10 and the central axis O of the main combustion chamber be in the range of from 60 to 90 degrees. In addition, it is preferable that the opening 10 of the connecting passage 9 be arranged in the horizontal plane which divides the volume of the main combustion chamber into equal halves.

As mentioned above, when the swirl motion is created, the combustion gas having a small specific weight, which is collected in the center of the swirl motion, cannot move easily towards the unburned mixture having a large specific weight located around the combustion gas, since the combustion gas is acted upon by an action of pushing the combustion gas back towards the center of the swirl motion due to the buoyancy created based on the centrifugal force difference of the above-mentioned specific weights. Consequently, the flame cannot spread easily towards the periphery of the swirl motion. Contrary to this, when the combustible mixture located on the periphery of the swirl motion is ignited and, thus, when the unburned gas is collected on the central portion of the swirl motion, the combustion gas having a light weight can easily move towards the central portion of the swirl motion. As a result, the combustible mixture is instantaneously burned.

As previously mentioned, according to the present invention, the opening 10 of the connecting passage 9 is arranged so as to be directed in the circumferential direction of the inner wall 3a of the cylinder head 3. Consequently, the burning jet injected from the connecting passage 9 causes a swirl motion of the combustible mixture in the main combustion chamber 5 as is shown by the arrow P in FIG. 2. In addition, the combustion of the swirled combustible mixture in the main combustion chamber 5 is started by the burning jet from the periphery of the swirled combustible mixture. As mentioned above, the flame located on the periphery of the swirl motion can rapidly propagate to the central portion of the swirled combustible mixture; therefore, the combustible mixture in the main combustion chamber 5 is rapidly burned. As a result of this, the speed of the combustion in the main combustion chamber 5 is extremely quickened. In addition, in order to create a strong swirl motion in the main combustion chamber 5, it is preferable that a swirl motion be created in the main combustion chamber 5 before the burning jet causes a swirl motion of the combustible mixture in the main combustion chamber 5. Consequently, it is preferable that, as is shown by the broken line in FIG. 2, an intake port 13 be tangentially connected to the inner wall 3a of the cylinder head so as to create a swirl motion rotating in the direction P at the time of the intake stroke.

Figure 4:
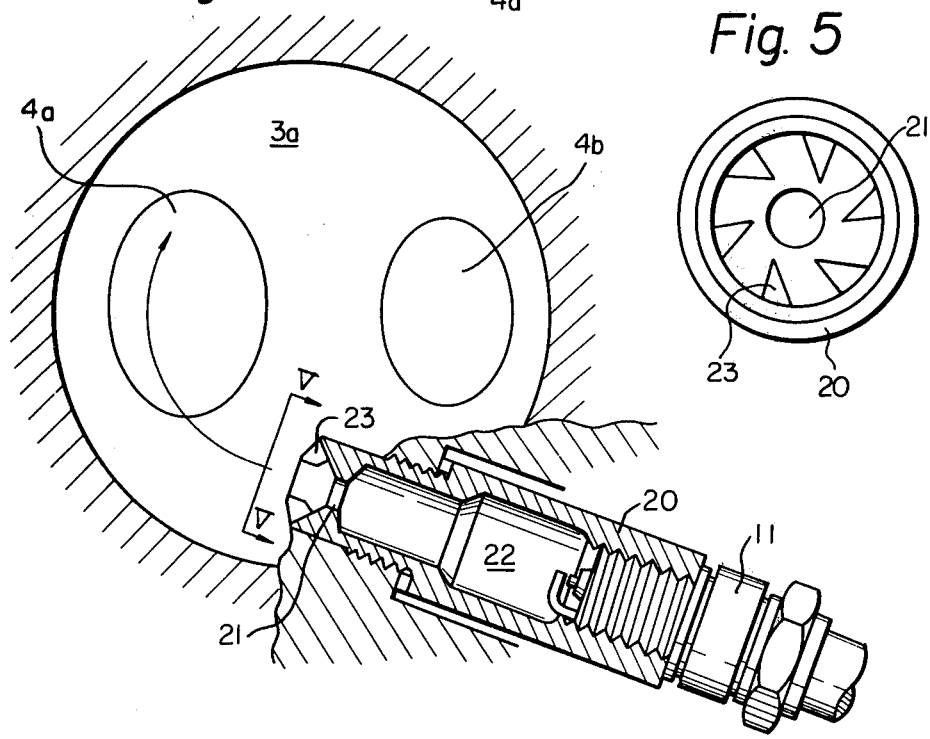
FIG. 4 is a bottom view of the cylinder head shown in FIG. 3, which shows a cross-sectional view of the auxiliary chamber component, taken along the line IV—IV in FIG. 3.
Figure 5:
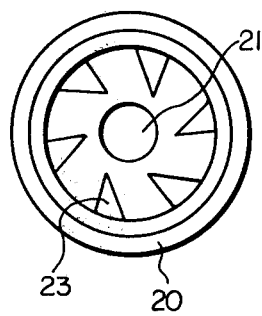
FIG. 5 is a view taken along the line V—V in FIG. 4.
Figure 3:
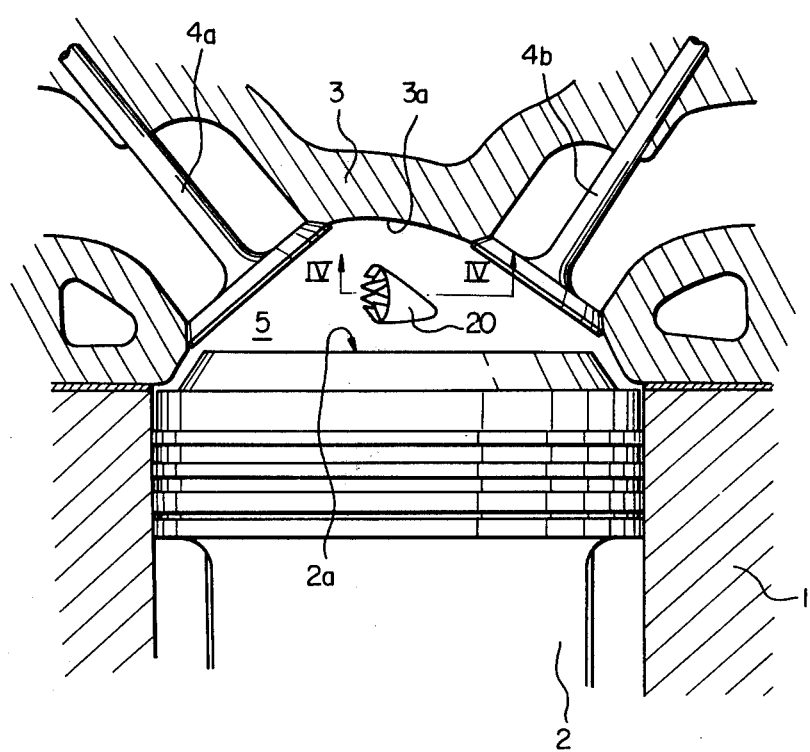
FIG. 3 is a cross-sectional side view of an alternative embodiment according to the present invention.

FIGS. 3 through 5 show an alternative embodiment according to the present invention. In this embodiment, an auxiliary chamber component 20 is screwed into the cylinder head 3, and a connecting passage 21 and an auxiliary combustion chamber 22 are formed in the auxiliary chamber component 20. In addition, similar to the embodiment shown in FIGS. 1 and 2, the spark gap of the spark plug 11 is located on the central axis of the auxiliary combustion chamber 22. Furthermore, in the embodiment shown in FIGS. 3 through 5, a plurality of vanes 23 are arranged in the vicinity of the connecting passage 21 so that the combustible mixture forced into the auxiliary combustion chamber 22 from the main combustion chamber 5 at the time of the compression stroke is caused to create a swirl motion about the axis of the auxiliary combustion chamber 22. In this embodiment, similar to the embodiment shown in FIGS. 1 and 2, since the combustible mixture located in the central portion of the swirl motion is ignited by the spark plug 11, the burning jet continues to be injected from the connecting passage 21 for a long time. In addition, the opening of the connecting passage 21 is arranged on the periphery of the inner wall 3a of the cylinder head 3 and is directed in the circumferential direction of the inner wall 3a of the cylinder head 3. Consequently, since the combustible mixture located on the periphery of the swirl motion in the main combustion chamber 5 is ignited by the burning jet in the same manner as described with reference to FIGS. 1 and 2, the speed of the combustion in the main combustion chamber 5 is extremely quickened.

According to the present invention, since the burning jet continues to be injected until the combustion in the main combustion chamber has been completed and, in addition, since the combustible mixture in the main combustion chamber is rapidly burned, the speed of the combustion in the main combustion chamber can be extremely quickened. As a result of this, a satisfactory stable combustion can be obtained, and the amount of harmful components in the exhaust gas can be greatly reduced.

While the invention has been described with reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder having a cylinder block and a cylinder head fixed onto said cylinder block;
   a piston reciprocally movable in said cylinder block;
   a main combustion chamber formed between a top surface of said piston and an inner surface of said cylinder head;
   an intake valve movably mounted on the cylinder head for leading a combustible mixture into the main combustion chamber;

an exhaust valve movably mounted on the cylinder head for discharging an exhaust gas into the atmosphere;

means to supply fuel directly only to said main combustion chamber, said cylinder head having therein an auxiliary combustion chamber extending symmetrically about an axis, said auxiliary combustion chamber having a circumferential inner wall including a raised annular portion defining a restricted opening interconnecting and of smaller diameter than a substantially spherically shaped first portion of said auxiliary combustion chamber located near the main combustion chamber and a second portion of said auxiliary combustion chamber located further from the main combustion chamber than the first portion, wherein said restricted opening is the only opening in said second portion of said auxiliary combustion chamber, the volume of said first portion of said auxiliary chamber is smaller than the volume of said second portion of said auxiliary chamber, the ratio of the diameter of said annular portion to the diameter of said second portion of said auxiliary chamber is less than 0.8, and the diameter of the second portion of the auxiliary chamber is greater than the axial length of said second portion, a single passage means connecting the main combustion chamber and the auxiliary combustion chamber through the circumferential wall of said first portion of said auxiliary chamber, the inner end of said passage means being substantially tangentially disposed relative to the circumferential wall of said first portion of said auxiliary chamber and extending to the main combustion chamber so as to create a swirling motion of a combustible mixture in the first and second portions of said auxiliary combustion chamber, and a spark plug having a spark gap located in the vicinity of said symmetrical axis and the second portion of said auxiliary combustion chamber, said restricted opening allowing the flow of a combustion gas from said second portion to said first portion, both of which portions are of greater diameter than the restricted opening, said combustion gas being collected in the vicinity of said symmetrical axis after said combustible mixture is ignited, while said restricted opening prevents outflow of unburned mixture from said second portion to said first portion, said unburned mixture being collected on the peripheral region in said second portion removed from said symmetrical axis due to the centrifugal force caused by said swirling motion of said combustible mixture, and wherein said single passage means has an opening which is directed in a circumferential direction with respect to the inner wall of said main combustion chamber.

2. An internal combustion engine as in claim 1, wherein said spark gap is located on said symmetrical axis in the end of the second portion of said auxiliary combustion chamber most remote from said first portion.

3. An internal combustion engine as in claim 1, wherein the ratio of the distance between the central axis of the main combustion chamber and the opening of the single passage means into said main combustion chamber to the radius of the piston is in the range of from 0.5 to 0.8:1.

4. An internal combustion engine as in claim 1, wherein the angle $\alpha$ between the axis of the single passage means at its opening in the main combustion chamber and a line passing through said opening and the axis of the main combustion chamber is in the range of from 60 to 90°.

5. An internal combustion engine as in claim 1, wherein the opening of the single passage means into the main combustion chamber is arranged in a horizontal plane which divides the volume of the main combustion chamber into equal halves.

6. An internal combustion engine as in claim 1, wherein the intake port is tangentially connected to the inner wall of the cylinder head so as to create a swirl motion in the main combustion chamber at the time of the intake stroke in the same circumferential direction as the opening of the single passage means into said main combustion chamber.

* * * * *